US012485262B2

(12) United States Patent
Kakaraparthi et al.

(10) Patent No.: US 12,485,262 B2
(45) Date of Patent: Dec. 2, 2025

(54) LOCKING CONNECTOR COUPLING ASSEMBLY

(71) Applicant: CareFusion 303, Inc., San Diego, CA (US)

(72) Inventors: Prabhath Kakaraparthi, Nellore (IN); Niranjan Lekkala, Bangalore (IN); Thotapalli Suryakiran, Peddapadagupadu Village (IN)

(73) Assignee: CAREFUSION 303, INC., San Diego, CA (US)

( * ) Notice: Subject to any disclaimer, the term of this patent is extended or adjusted under 35 U.S.C. 154(b) by 154 days.

(21) Appl. No.: 18/195,319

(22) Filed: May 9, 2023

(65) Prior Publication Data
US 2024/0377007 A1    Nov. 14, 2024

(51) Int. Cl.
*A61M 39/10*    (2006.01)
(52) U.S. Cl.
CPC . *A61M 39/1011* (2013.01); *A61M 2039/1027* (2013.01)
(58) Field of Classification Search
CPC ....... A61M 39/1011; A61M 2039/1027; F16L 37/20
See application file for complete search history.

(56) References Cited

U.S. PATENT DOCUMENTS

| | | | |
|---|---|---|---|
| 2009/0287140 A1* | 11/2009 | Rittman, III | A61B 90/11 |
| 2010/0056933 A1 | 3/2010 | Grabl et al. | |
| 2018/0050186 A1* | 2/2018 | Lauer | A61M 39/1011 |
| 2021/0131596 A1* | 5/2021 | Mitrovic | A61M 39/1011 |
| 2021/0372551 A1 | 12/2021 | Clark et al. | |
| 2023/0139756 A1 | 5/2023 | Wine et al. | |
| 2023/0355946 A1* | 11/2023 | Kuriyama | A61M 39/1011 |

OTHER PUBLICATIONS

International Search Report and Written Opinion for Application No. PCT/US2024/027492, dated Jul. 25, 2024, 10 pages.
International Preliminary Report on Patentability from the International Preliminary Examining Authority for Application No. PCT/US2024/027492, dated Apr. 4, 2025, 14 pages.

* cited by examiner

*Primary Examiner* — Zachary T Dragicevich
(74) *Attorney, Agent, or Firm* — MASCHOFF BRENNAN

(57) ABSTRACT

A coupler having a first connector including a first end having an inlet and a second end opposite the first end having an opening. The first connector including at least one engaging member disposed between the first end and the second end. The coupler having a second connector including a body extending from an outlet portion. The body configured to be at least partially inserted into the opening to couple the second connector to the first connector. The outlet portion including at least one arm having a securing member configured to engage with the engaging member to secure the first connector to the second connector. When the second connector is coupled to the first connector, the outlet portion is exposed. The first connector is configured to decouple from the second connector in response to a pullout force exceeding a predetermined threshold force.

19 Claims, 4 Drawing Sheets

LOCKING CONNECTOR COUPLING ASSEMBLY

FIELD OF THE INVENTION

The present disclosure generally relates to connectors, and, in particular, to connector couplings.

BACKGROUND

Medical treatments often include the infusion of a medical fluid (e.g., a saline solution or a liquid medication) to patients using an intravenous (IV) catheter that is connected though an arrangement of flexible tubing and fittings, commonly referred to as an "IV set," to a source of fluid, for example, an IV bag. Often, tubing or catheters are coupled or secured to each other to allow fluid communication between various portions of tubing or catheters.

In some applications, such tubing or catheters may become dislodged due to improper securement and/or when the coupling is subject to forces greater than what the coupling is designed to withstand.

SUMMARY

One or more embodiments of the present disclosure are directed to a coupler having a first connector including a first end with an inlet and a second end opposite the first end and having an opening, the first connector including at least one engaging member disposed between the first end and the second end, and a second connector including a body extending from an outlet portion, the body configured to be at least partially inserted into the opening to couple the second connector to the first connector, the outlet portion including at least one arm having a securing member configured to engage with the engaging member to secure the first connector to the second connector, wherein when the second connector is coupled to the first connector, the outlet portion is exposed. The first connector is configured to decouple from the second connector in response to a pullout force exceeding a predetermined threshold force.

In some embodiments, the first connector includes a coupling portion disposed at the first end and a first connector body extending from the coupling portion, the first connector body including the opening. The first connector body may include the at least one engaging member.

In some embodiments, the securing member is a protrusion extending from a distal end of the at least one arm. The engaging member may be a groove circumferentially disposed on the first connector, the groove sized and shaped to receive and secure the protrusion of the at least one arm when the second connector is coupled to first connector.

In some embodiments, the securing member is a recess disposed at a distal end of the at least one arm. The engaging member may be an edge circumferentially disposed on the first connector, the recess of the at least one arm being sized and shaped to receive and secure the edge when the second connector is coupled to first connector.

In some embodiments, the pullout force is a force applied to the first connector along a central axis of the first connector and the central axis extends at least along a length of the first connector. The central axis may extend through the first connector and the second connector when the first connector is coupled to the second connector.

In some embodiments, the at least one engaging member is groove circumferentially disposed on the first connector. The at least one engaging member is an edge circumferentially disposed on the first connector.

In some embodiments, the outlet portion includes an outlet and the body of the second connector includes a channel extending from the outlet to a second connector opening such that the outlet and the second connector opening are in fluid communication.

In some embodiments, the at least one arm includes a first portion extending away from the outlet portion and a second portion that extends radially inward. The at least one arm is biased radially inward and is configured to deflect radially outward.

In some embodiments, the securing member disengages from the engaging member in response to the pullout force exceeding the predetermined threshold force.

In some embodiments, the first connector is configured to remain coupled to the second connector when the pullout force does not exceed the predetermined threshold force.

In some embodiments, the coupler has a first configuration and in the first configuration the first connector is coupled to the second connector such that a fluid pathway is formed. The coupler has a second configuration and in the second configuration the first connector is decoupled from the second connector preventing formation of a fluid pathway.

One or more embodiments of the present disclosure are directed to a coupler having a first connector with a first end having a coupling portion with an inlet, a second end opposite the first end and having an opening, and a first connector body extending from the coupling portion to the second end, the first connector including at least one engaging member disposed on the first connector body, and a second connector including an outlet portion having an outlet and a body extending from the outlet portion, the body being configured to be at least partially inserted into the opening to couple the second connector to the first connector, the outlet portion including at least one arm having a securing member configured to engage with the engaging member to secure the first connector to the second connector, the at least one arm being biased radially inward and configured to deflect radially outward. When the second connector is coupled to the first connector, the outlet portion is exposed and a fluid pathway forms from the inlet of the first connector to the outlet of the second connector. The first connector is configured to decouple from the second connector in response to a pullout force exceeding a predetermined threshold force.

One or more embodiments of the present disclosure are directed a coupler having a substantially cylindrical first connector including a first end with a coupling portion with an inlet, a second end opposite the first end and having an opening, and a first connector body extending from the coupling portion to the second end, the first connector including at least one engaging member circumferentially disposed on the first connector body between the first end and the second end, and a second connector including an outlet portion having an outlet and a body extending from the outlet portion, the body including a channel in fluid communication with the outlet and the body being configured to be at least partially inserted into the opening to couple the second connector to the first connector, the outlet portion including at least one arm having a securing member configured to engage with the engaging member to secure the first connector to the second connector, the at least one arm including a first portion extending away from the outlet portion and a second portion that extends radially inward, the at least one arm being biased radially inward and configured to deflect radially outward. When the second connector is coupled to the first connector, the outlet portion is exposed and a fluid pathway forms from the inlet of the first connector to the outlet of the second connector. The securing member disengages from the engaging member and the first connector is configured to decouple from the second connector in response to a pullout force exceeding a predetermined threshold force.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
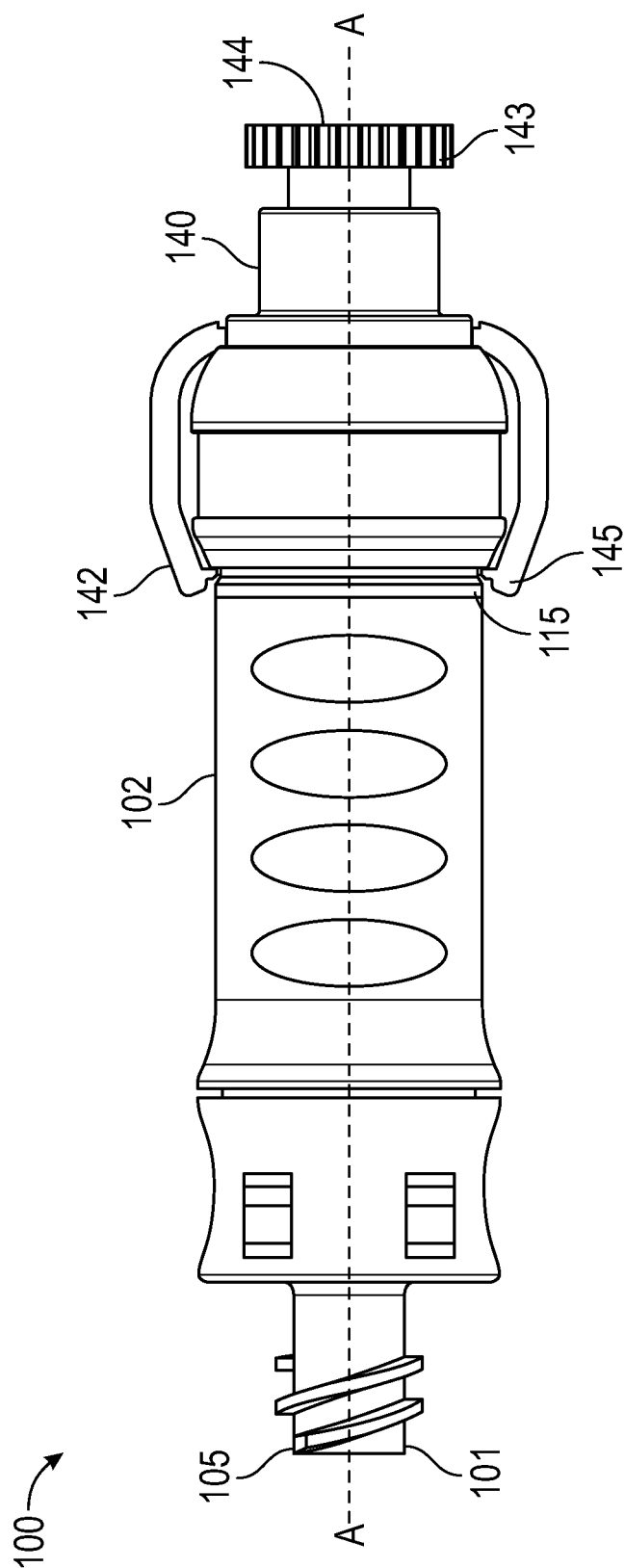
FIG. 1 is a side view of a coupler assembly in a first configuration, in accordance with various aspects of the present disclosure.

The disclosed coupler assembly includes a first connector and a second connector. The first connector is configured to couple to the second connector. The coupler assembly may have a first configuration and a second configuration. In the first configuration, the first connector is coupled to the second connector and a fluid pathway is formed allowing for the flow of fluid from the first connector to the second connector. In the second configuration, the first connector is decoupled from the second connector and the fluid pathway is no longer formed thereby preventing flow of fluid from the first connector to the second connector.

The coupler assembly may be configured to couple a first portion of tubing to a second portion of tubing. For example, the first portion of tubing may be coupled to the first connector and the second portion of tubing may be coupled to the second connector. The first portion of tubing and/or the second portion of tubing may also couple to a patient or fluid source. In some embodiments, the coupler assembly allows for the flow of fluid from the first portion of tubing to the second portion of tubing. For example, the first connector may be coupled to the second connector such that a fluid pathway is formed through the first connector and the second connector to allow the flow of fluid from the first portion of tubing through the first connector and the second connector to the second portion of tubing. The fluid pathway may allow for the flow of fluid from the second portion of tubing through the second connector and the first connector to the first portion of tubing.

In some embodiments, the first connector and second connector provide one way fluid flow. For example, when the first connector is coupled to the second connector, fluid may flow from the second connector to the first connector and not from the first connector to the second connector. In some embodiments, decoupling of the first connector from the second connector results in the flow of fluid from the second connector to the first connector ceasing, thereby preventing leakage when the first connector is decoupled from the second connector. In some embodiments, upon decoupling of the first connector from the second connector, the first connector is sterilized (e.g., via a sterilized cloth or a sterilizing device) or replaced with a new sterile connector to prevent infection or contamination that can occur if the first connector is re-used without sterilization. In some embodiments, the first connector is configured to decouple based on a force that exceeds a predetermined threshold force. When a force is applied to the first connector, such as a pullout force, that exceeds the predetermined threshold force, the first connector may decouple from the second connector. The pullout force may be a force that occurs along the longitudinal axis of the first connector. In some embodiments, the pullout force is caused by tugging or pulling on the first portion of tubing coupled to the first connector. Alternatively, the pullout out force applied to the first connector may be caused by tugging or pulling on the second connector and/or the second portion of tubing coupled to the second connector.

In some embodiments, once the first connector is decoupled from the second connector, the first connector is configured to be re-coupled to the second connector. For example, once the first connector decouples from the second connector (e.g., due to a disconnection event), the first connector may be configured to allow for re-coupling to the second connector after a disconnection event.

The detailed description set forth below is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. Reference numbers may have letter suffixes appended to indicate separate instances of a common element while being referred to generically by the same number without a suffix letter.

While the following description is directed to the connection of medical fittings for the administration of medical fluid using the disclosed coupler, it is to be understood that this description is only an example of usage and does not limit the scope of the claims. Various aspects of the disclosed coupler may be used in any application where it is desirable to secure the connection of various tubing and fittings.

The disclosed coupler assembly overcomes several challenges discovered with respect to certain conventional couplers. One challenge with certain conventional couplers is that certain conventional couplers may be improperly secured. Further, during use, certain conventional couplers may be designed to release or dislodge in response to relatively low pullout forces. For example, certain conventional couplers may release in response to pullout forces experienced during patients rolling over in bed, patients catching tubing or lines on bed rails, moving patients to a different bed, fidgeting by pediatric patients, and/or disoriented adult patients pulling out their lines. Indeed, the Association for Vascular Access (AVA) Annual Scientific Meeting in 2017 reported a 10% dislodgement rate for 1,000 patients fitted with peripheral IV catheters, translating to approximately 33 million dislodgements per year in the U.S. alone. Because the accidental or unintentional dislodgement of tubing, catheters, or fittings may interrupt the administration of medical fluids, the use of certain conventional couplers is undesirable.

Further, some conventional couplers require the use of clamps, such as infusion clamps. For example, infusion clamps may be used to prevent decoupling of the first connector from the second connector. A first connector may be coupled to a second connector to form a coupler, and in infusion clamp may be disposed around the coupler to secure the first connector to the second connector and prevent decoupling. Infusion clamps can be cumbersome and bulky, and also add to material costs. Some infusion clamps do not allow for decoupling in response to a disconnection event, thereby causing harm or injury to the user. For example, in some instances, decoupling of the first connector from the second connector may be necessary to provide further injury to the user. Some infusion clamps do not allow for decoupling of the first connector from the second connector.

Therefore, in accordance with the present disclosure, it is advantageous to provide couplers and coupler/connector assemblies as described herein that allows for improved securement of fittings or connectors. The disclosed couplers and coupler/connector assemblies are structured as described herein so as to permit the secure retention of the first connectors, while allowing for decoupling after a disconnection event.

Figure 2:
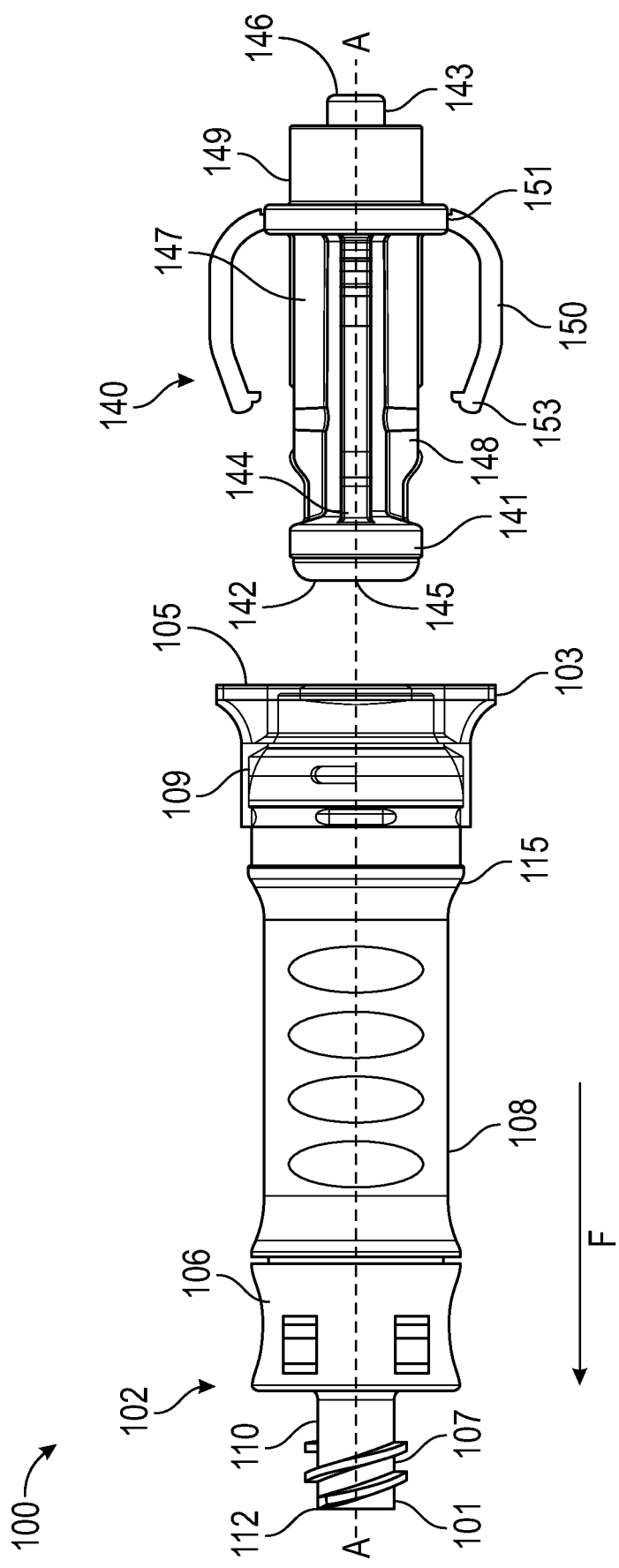
FIG. 2 is a side view of the coupler assembly of FIG. 1 in a second configuration in accordance with various aspects of the present disclosure.
Figure 3:
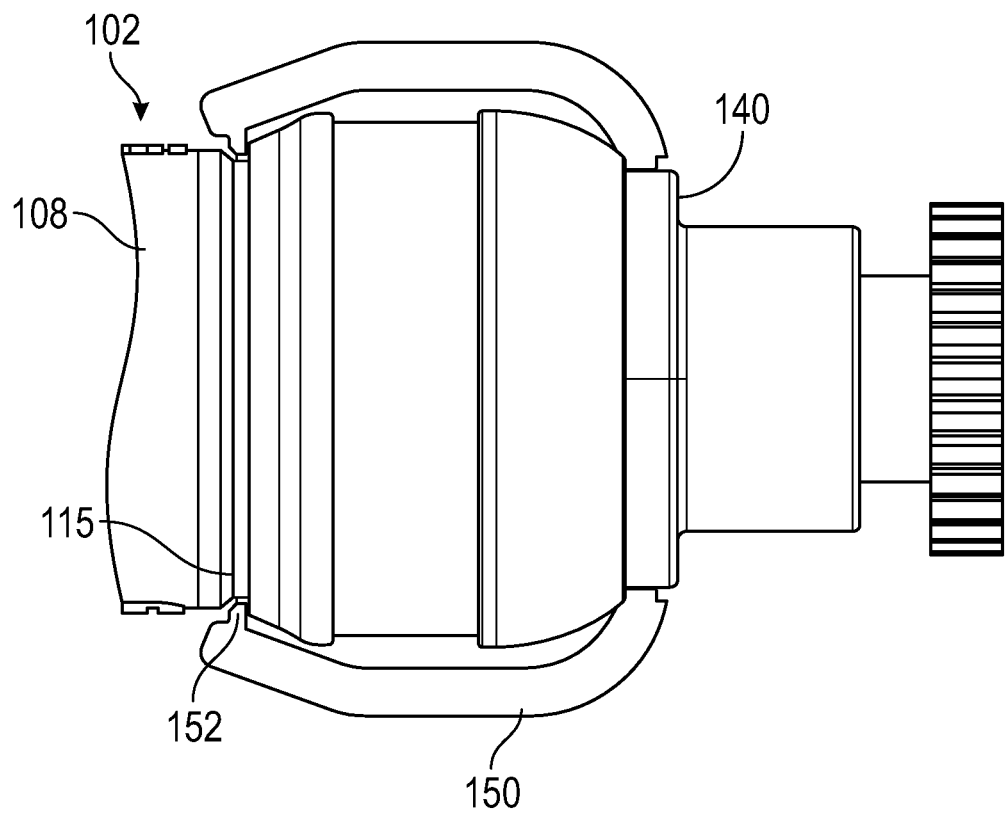
FIG. 3 is zoomed in side view of the coupler assembly of FIG. 1, in accordance with various aspects of the present disclosure.

FIG. 1 is a side view of a coupler assembly in a first configuration, in accordance with various aspects of the present disclosure. FIG. 2 is a side view of the coupler assembly of FIG. 1 in a second configuration in accordance with various aspects of the present disclosure. FIG. 3 is zoomed in side view of the coupler assembly of FIG. 1, in accordance with various aspects of the present disclosure.

With reference to FIGS. 1-3, coupler assembly 100 allows the flow of a fluid, such as a medical fluid, from a fluid source to a patient end by releasably coupling a portion of tubing or line with another portion of tubing or line in fluid communication. Coupler assembly 100 may include first connector 102 and second connector 140. First connector 102 may be configured to couple to second connector 140. In some embodiments, first connector 102 and/or second connector 140 are one way connectors. In the depicted example, portions of tubing can be terminated with connectors/valves, such as first connector 102 and/or second connector 140. In some embodiments, fluid from a fluid source flows through coupler assembly 100 to a patient end. A cannula or needle may be inserted within a patient (e.g., at the patient end) allowing medical fluid to flow from the fluid source through coupler assembly 100 and into a patient at the patient end. In some embodiments, decoupling of first connector 102 from second connector 140 interrupts or prevents flow from the fluid source to the patient end (e.g., the patient). First connector 102 may be coupled to a fluid source via a portion of first tubing and second connector 140 may be coupled to a patient via a portion of second tubing. In some embodiments, when first connector 102 is coupled to second connector 140, a fluid pathway is formed allowing fluid to flow from second connector 140 to first connector 102.

In some embodiments, coupler assembly 100 includes central axis A-A and first connector 102 and second connector 140 are coupled in series along central axis A-A. First connector 102 and/or second connector 140 may allow for the connection and/or disconnection of tubing to allow for selective fluid communication therebetween. Central axis A-A may extend longitudinally along the length of first connector 102 and second connector 140.

Coupler assembly 100 may have a first configuration (FIG. 1) and a second configuration (FIG. 2). In the first configuration, first connector 102 is coupled to second connector 140 and fluid flows from first connector 102 to second connector 140 such that a fluid pathway is formed between first connector 102 and second connector 140 to allow for fluid to flow from first connector 102 to second connector 140. In some embodiments, coupler assembly 100 transitions from the first configuration to the second configuration in response to a disconnection event. A disconnection event may occur when a pullout force is applied to first connector 102 causing axial movement of first connector 102 relative to second connector 140. In some embodiments, axial movement of first connector 102 relative to second connector 140 is caused when the pullout force applied to first connector 102 exceeds a predetermined threshold force.

In some embodiments, first connector 102 is coupled to a first portion of tubing to allow the first portion of tubing to be connected and/or disconnected with second connector 140. First connector 102 may be coupled to a portion of tubing that couples to a fluid source. First connector 102 may include first end 101 and second end 103. First end 101 may be coupled to tubing (e.g., a first portion of tubing) and second end 103 may be configured to couple to a portion second connector 140. For example, second end 103 of first connector 102 may be configured to a portion of second connector 140 to allow first connector 102 to be in fluid communication with second connector 140. In some embodiments, a portion of tubing can be coupled with, or engage with first end 101 of first connector 102. First connector 102 via first end 101 may be in fluid communication with the tubing to allow fluid to pass through first connector 102.

In some embodiments, first end 101 can have a flat surface to allow for clinicians to easily clean and disinfect first end 101. First end 101 may be in fluid connection with second end 103. First end 101 and second end 103 may be disposed along the longitudinal length of first connector 102. For example, first end 101 and second end 103 may be disposed along central axis A-A.

In some embodiments, first connector 102 is substantially cylindrical shaped. First connector 102 may include coupling portion 106 and body 108. Coupling portion 106 may be coupled to body 108. Coupling portion 106 may be disposed at first end 101 and configured to couple to a portion of tubing and/or a fluid source. In some embodiments, coupling portion 106 includes threaded portion 107 configured to couple to a portion of tubing, a syringe, a fluid source, a container, or any other component. In some embodiments, threaded portion 107 has a diameter less than the maximum diameter of coupling portion 106. Threaded portion 107 may include one or more threads to allow threaded portion 107 to couple to a portion of tubing and/or a fluid source. Threaded portion 107 may extend from coupling portion 106 along central axis A-A. Coupling portion 106 may include inlet 112. Inlet 112 may be an opening that allows fluid to flow into first connector 102. Inlet 112 may be disposed proximate first end 102. In some embodiments, inlet 112 is disposed on thread portion 107.

In some embodiments, coupling portion 106 is coupled to body 108. Body 108 may be disposed proximate second end 103 compared to coupling portion 106. In some embodiments, body 108 has a length greater than a length of coupling portion 106. Coupling portion 106 may be removably coupled to body 108. In some embodiments, coupling portion 106 and body 108 form a unitary structure. Body 108 may include distal end 109. Distal end 109 may have a diameter greater than the rest of body 108. In some embodiments, body 108 flares outward as body 108 approaches distal end 109.

In some embodiments, coupling portion 106 is in fluid communication with body 108. For example, first end 101 and/or second end 103 may include an opening or channel to allow first end 101 and/or second end 103 to be in fluid communication with each other and/or one or more elements (e.g., tubing, connectors, valves, collars, attachments, etc.). For example, first end 101 may include inlet 112 configured to be coupled to a tube (e.g., a tube coupled to a patient) and second end 103 may include opening 105 to allow for fluid communication through first connector 102 and fluid flow out of first connector 102. Opening 105 may be disposed proximate second end 103 and may be configured to receive second connector 140. Inlet 112 may be in fluid communication with opening 105.

In some embodiments, opening 105 is configured to receive second connector 140 such that a portion of second connector 140 is disposed within body 108. First connector 102 may include one or more valves or springs configured to control the flow of fluid through first connector 102. For example, first connector 102 may include one or more valves that are configured to prevent flow of fluid through first connector 102 unless a pressure is applied to the valve. In some embodiments, second connector 140 being at least partially inserted into first connector 102 results in the valve of first connector 102 allowing fluid flow through first connector 102. First connector 102 may be prevented from allowing flow through first connector 102 until second connector 140 is inserted into first connector 102 (e.g., via opening 105).

In some embodiments, body 108 is sized and shaped to receive and secure second connector 104. For example, second connector 140 may be inserted through opening 105 and into body 108 to couple second connector 140 to first connector 102. Second connector 140 may be inserted into body 108 such that a portion of second connector 140 (e.g., opening 142) abuts or is disposed proximate coupling portion 106.

In some embodiments, second connector 140 includes a valve or plug (e.g., valve or plug 145) configured to engage with the valve of first connector 102. For example, when second connector 140 is inserted into and disposed within first connector 102, the valve of first connector 102 may abut or engaged with the valve of second connector 140 to allow first connector 102 to be in fluid communication with second connector 140. In some embodiments, second connector 140 is inserted into first connector 102 (e.g., body 108) such that second connector 140 engages a valve assembly, which may include a spring. The valve assembly (and spring) may be biased to seal inlet 112 to prevent flow of fluid from first connector 102, such as first end 101. Inserting second connector 140 into body 108 causes second connector 140 to abut and push against the valve assembly thereby allowing fluid to flow from inlet 112 through coupling portion 106 and into second connector 140 disposed within body 108. Applying a compression force to the valve assembly of the first connector 102 may result in fluid flowing from inlet 112 into second connector 140, disposed in body 108.

In some embodiments, first connector 102 is configured to couple to second connector 140 such that fluid flows into first connector 102 and out of second connector 140. For example, first connector 102 may include an inlet (e.g., inlet 112) configured to receive fluid and second connector 140 may include an outlet (e.g., outlet 146) configured to allow fluid to exit second connector 140. In some embodiments, first connector 102 being coupled to second connector 140 and coupler assembly 100 being in the second configuration results in the inlet (e.g., inlet 112) of first connector 102 being in fluid communication with the outlet (e.g., outlet 146) of second connector 140.

In some embodiments, fluid can exit or flow through first connector 102. The flow path through first connector 102 can have a straight fluid pathway to make flushing easier and to reduce the risk of hemolysis. Optionally, first connector 102 can include features (e.g., raised features, gripping features) disposed on the outer surface of first connector 102 to allow a clinician to more easily handle or manipulate first connector 102. Some embodiments of first connector 102 may provide connectors that are compatible with connectors of other portions of fluid delivery systems. First connector 102 may be substantially cylindrically shaped.

In some embodiments, body 108 includes one or more engaging members. The engaging members may include grooves 115 or edges 116. Grooves 115 may be circumferentially disposed around body 108. Grooves 115 may be disposed proximate second end 103. Grooves 115 may be configured to receive a portion of second connector 140 when second connector 140 is at least partially inserted into body 108. Grooves 115 may be configured to secure a portion a portion of second connector 140 (e.g., via friction) to prevent second connector 140 from decoupling or being withdrawn from body 108 of first connector 102, as discussed below. Grooves 115 may be disposed between body 108 and distal end 109. For example, body 108 may flare outwards as body 108 approaches distal end 109. Grooves 115 may be disposed on a portion of body 108 that flares outwards. Body 108 may include a plurality of grooves 115. The plurality of grooves 115 may have different depths and/or widths, or may all have the same depths and/or widths.

In some embodiments, body 108 includes edges 116 disposed between grooves 115. Body 108 may include edges 116 circumferentially disposed around body 108. Edges 116 may be disposed between grooves 115 such that a series of circumferential edges 116 forms a plurality of grooves 115. In some embodiments, first connector 102 includes grooves 115, edges, 116, or both grooves 115 and edges 116.

Referring to FIGS. 2-3, second connector 140 may include first end 141, second end 143, and body 148. Body 148 may extend from first end 141 to second end 143. Body 148 may include channel 144 extending from first end 141 to second end 143. In some embodiments, first end 141 includes opening 142 and second end 143 includes outlet 146. Opening 142 may be in fluid communication with outlet 146 via channel 144. In some embodiments, body 148 includes flanges 147 extending from channel 144. Channel 144 may have two flanges 47, each extending away from central axis A-A and opposite each other. A maximum width of second connector 140, due to channel 144 and flanges 147 may be less than a maximum diameter of body 108 and/or first connector 102.

Second connector 140 may include valve or plug 145 disposed proximate first end 141. Valve 145 may be configured to control the flow of fluid through opening 142. In some embodiments, valve 145 is disposed within opening 142. Valve 145 may be configured to abut or engage with the valve of first connector 102 to allow a fluid pathway to form between first connector 102 and second connector 140 when second connector 140 is disposed within first connector 102. Second connector 140 may include outlet portion 149 disposed proximate second end 143. Outlet portion 149 may include outlet 146.

In some embodiments, when second connector 140 is at least partially disposed within first connector 102, outlet portion 149 remains exposed. For example, when second connector 140 is at least partially disposed within body 108, outlet portion 149 may remain outside of body 108. In some embodiments, when second connector 140 is at least partially disposed within first connector 102, first end 141, opening 142, channel 144, and flanges 147 are disposed within body 108 of first connector 102. Flanges 147 may be configured to prevent excessive movement within body 108 when second connector 140 is disposed within first connector 102.

In some embodiments, second connector 140 includes one or more arms 150. Arms 150 may extend from outlet portion 149. For example, arms 150 may extend away from central axis A-A. Arms 150 may be curved such that a first portion of arms 150 proximate second end 143 extends away from central axis A-A and a second portion of arms 150 proximate first end 141 extends towards first end 141. In some embodiments, arms 150 are curved or angled. Arms 150 may extend from outlet portion 149 towards first end 141. In some embodiments, second connector 140 includes two arms 150 (FIG. 2). Alternatively, second connector 140 includes one arm 150 (FIG. 4), three arms, four arms, or more than four arms. In some embodiments, second connector 140 includes two arms 150 disposed opposite one another such that second connector 140 is substantially symmetrical.

Arms 150 may extend from outlet portion 149 at an angle of 180 degrees and 90 degrees. In some embodiments, arms 150 extend from outlet portion 149 at an angle of 90 degrees to 180 degrees, such as approximately 175 degrees, approximately 170 degrees, approximately 160 degrees, approximately 150 degrees, approximately 140 degrees, approximately 130 degrees, or greater than 90 degrees. Arms 150 may extend away from outlet portion 149 and may extend towards first end 101 such that arms 150 extend past the midpoint of body 148. In some embodiments, arms 150 has one or more inflection points. The one or more inflection points may be points along arms 150 where the angle of arms 150 varies or changes. For example, arms 150 may have one inflection point such that a first portion of arm 150 extends at a first angle and a second portion of arms 150 extends at a second angle different than the first angle. Arms 150 may have two inflection points, three inflection points, more than three inflection points. In some embodiments, arms 150 are substantially curved resulting in many inflection points.

Arms 150 may include proximal end 151 and distal end 153. Arms 150 may be coupled to outlet portion 149 at proximal end 151 and may extend to distal end 153. In some embodiments, the straight line distance between proximal end 153 and distal end 153 of arm 150 is less a length than the overall length of arm 150. In some embodiments, arms 150 are configured to extend away from body 148 and/or central axis A-A proximate proximal end 151 and then radially curve towards body 148 and/or central axis A-A proximate distal end 153. Each arm 150 may have a thickness less than a maximum thickness of body 148.

In some embodiments, arms 150 are integrally formed with outlet portion 149. Alternatively, arms 150 may be removably coupled to outlet portion 149. Arms 150 may be rotatable relative to outlet portion 149 such that arms 150 are configured to rotate about central axis A-A and/or body 148. Arms 150 may be comprised of a substantially rigid, yet flexible material that allows for arms 150 to deflect without breaking.

Arms 150 may be configured to flex towards and away from central axis A-A and body 148. For example, arms 150 may be configured to deflect radially outwards or inwards. Arms 150 may be biased radially inward and may be configured to deflect radially outward in response to a force or pressure.

Arms 150 may include one or more securing members, such as protrusions 152 (FIG. 3) and/or recess 156 (FIG. 4), configured to extend from distal end 151 153 of arms 150. Protrusions 152 may be configured to engage and be disposed within grooves 115 of first connector 102 when second connector 140 is coupled (e.g., at least partially disposed within) to first connector 102.

Referring to FIG. 3, when second connector 140 is coupled to first connector 102, arms 150 are disposed around body 108 such that protrusions 152 are disposed within grooves 115. In practice, inserting second connector 140 at least partially into first connector 102 results in protrusions 152 engaging with and being disposed within grooves 115. Protrusions 152 being disposed within grooves 115 assists in securing second connector 140 to first connector 102. Protrusions 152 engaging with grooves 115 prevents decoupling of second connector 140 from first connector 102. First connector 102 may include a plurality of grooves 115, each having a different depth to allow for various engagement and securing profiles with protrusions 152. For example, first connector 102 may have a first groove 115 having a shallow depth and a second groove 115 having a deeper depth than the first groove. Protrusion 152 being disposed with the first shallow groove may results in second connector 140 being more easily decoupled from first connector 102 compared to when protrusion 152 is in the second deeper groove. The depth and width of groove 115 may determine the amount of force required to cause protrusion 152 to be removed from groove 115.

In practice, when a user inserts second connector 140 into body 108 of first connector 102, arms 150 deflect radially outward as arms 150 pass over outlet portion 149. Arms 150 may approach their initial biased inward position as distal end 153 of arms 150 approach grooves 115. When protrusions 152 are disposed within groove 115, arms 150 may be deflect radially outward such that arms 150 apply a force or pressure to body 108 and protrusions 152 apply a force to grooves 115 due to arms 150 being biased radially inward. The force applied by protrusions 152 to grooves 115 assist in securing protrusions 152 within grooves 115, which assists in preventing second connector 140 from decoupling from first connector 102. In some embodiments, protrusion 152 being disposed within grooves 115 results in first end 141 of second connector 140 being proximate coupling portion 106 of first connector 102 resulting in a fluid pathway being formed between first connector 102 and second connector 140.

Figure 4:
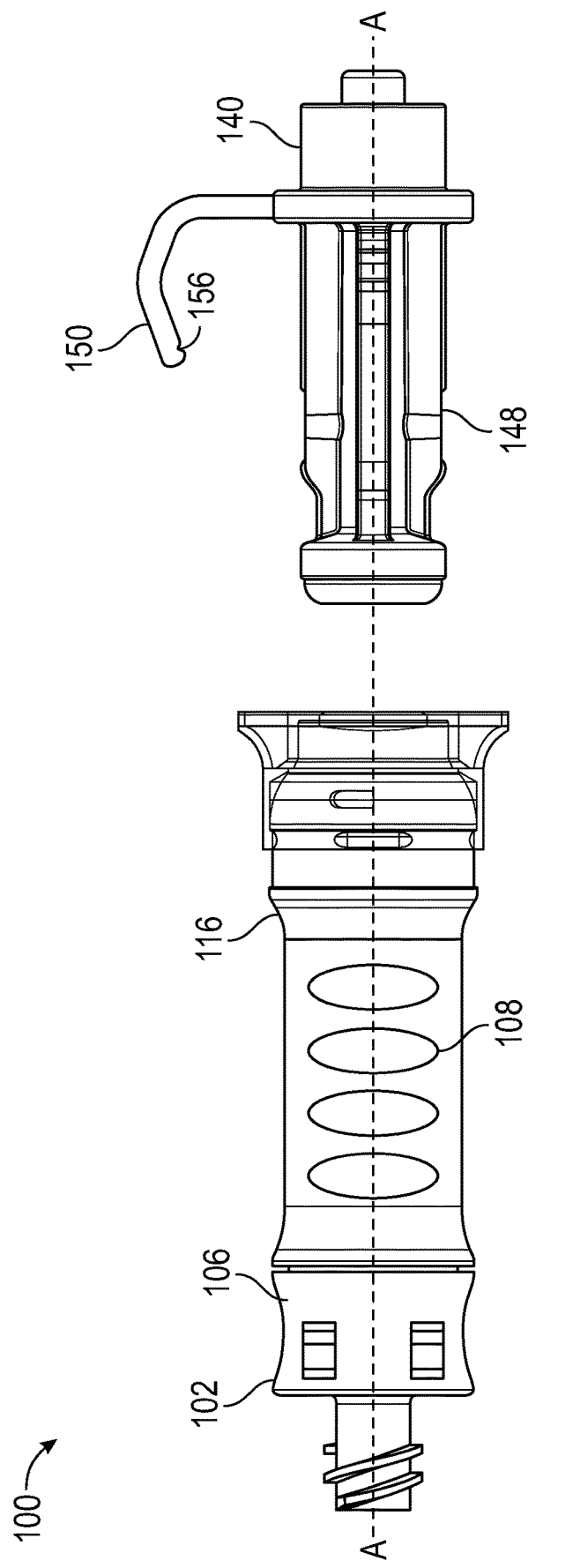
FIG. 4 is a side view of a coupler assembly in a second configuration in accordance with various aspects of the present disclosure.

Referring to FIG. 4, arms 150 may include recess 156 configured to engage with edges 116 of body 108 when second connector 140 is coupled to first connector 102. In some embodiments, recess 156 are configured to engage with edge 116 such edge 116 is disposed within recess 156. The friction between edge 116 and recess 156 when edge 116 is disposed within recess 156 secures arm 150 to body 108 thereby securing second connector 140 to first connector 102.

In practice, when a user inserts second connector 140 into body 108 of first connector 102, arms 150 deflect radially outward as arms 150 pass over outlet portion 149. Arms 150 may approach their initial biased inward position as distal end 153 of arms 150 approach edge 116. When recess 156 engage with edge 116, arms 150 may be deflected radially outward such that arms 150 apply a force or pressure to body 108 and recess 156 applies a force to edge 116 due to arms 150 being biased radially inward. The force applied by recess 156 to edge 116 assist in securing edge 116 within recess 156, which assists in preventing second connector 140 from decoupling from first connector 102. In some embodiments, edge 116 being disposed within recess 156 results in first end 141 of second connector 140 being proximate coupling portion 106 of first connector 102 resulting in a fluid pathway being formed between first connector 102 and second connector 140.

In some embodiments, coupler assembly 100 is configured to be in a second configuration. In the second configuration, first connector 102 is decoupled from second connector 140. Coupler assembly 100 may transition from the first configuration to the second configuration in response to a disconnection event. The disconnection event may be in response to a pullout force. For example, a pullout force (e.g., force F) may be applied to first connector 102, either by being directly applied to first connector 102 or indirectly applied to first connector 102, such as being applied to tubing coupled to first connector 102. The pullout force may cause first connector 102 to move axially away from and second connector 140 along central axis A-A thereby decoupling first connector 102 second connector 140. In some embodiments, decoupling first connector 102 from second connector 140 requires radially deflecting arms 150 such that protrusions 152 are no longer disposed within grooves 115. For example, in response to the pullout force, protrusions 152 may slide out of grooves 115 resulting in second connector 140 no longer being secured to first connector 102.

In some embodiments, application of the pullout force causes protrusions 152 to be removed from grooves 115. Upon application of the pullout force, protrusions 152 are removed from grooves 115 thereby allowing first connector 102 to decouple from second connector 140. In some embodiments, first connector 102 is decoupled second connector 140 when force F exceeds a predetermined threshold force. For example, if force F is less than the predetermined threshold force, first connector 102 may not decouple from second connector 140. The predetermined threshold force prevents inadvertent or accidental decoupling based on minor forces or movements. The predetermined threshold force may be based on the flexibility and/or stiffness of arms 150, protrusions 152, and/or grooves 115. For example, the higher the stiffness of arms 150, protrusions 152, and/or grooves 115, the higher the predetermined threshold force.

In some embodiments, first connector 102 includes grooves 115 of various depths and/or widths to increase the frictional force between groove 115 and protrusion 152 to prevent inadvertent decoupling of first connector 102 from second connector 140. In some embodiments, when the pullout force exceeds the predetermined threshold force, protrusions 152 may fail to remain within grooves 115 thereby permitting decoupling of the first connector 102 from second connector 140.

In some embodiments, the predetermined threshold force is approximately 4 pounds (lbs). The predetermined threshold force may be from approximately 1 lb to approximately 8 lbs, approximately 3 lbs to approximately 7 lbs, approximately 4 lbs to approximately 6 lbs, or greater than 8 lbs. For example, a patient may have a needle/catheter inserted into their skin and the needle/catheter may be coupled to first connector 102 or second connector 140. The patient may walk away from an infusion pump or accidental pull on a fluid line coupled to first connector 102 or second connector 140 and the force exceeds 4 lbs, first connector 102 may automatically release or decouple from second connector 140, effectively closing the fluid pathway between first connector 102 and second connector 140, as described herein.

In some embodiments, upon decoupling of first connector 102 from second connector 140, a user sterilizes first connector 102 and recouples first connector 102 to second connector 140. In some embodiments, a user may sterilize first connector 102 and/or second connector 140. Recoupling first connector 102 to second connector 140 results in coupler assembly 100 transitioning from the second configuration to the first configuration.

The disclosures described herein include at least the following clauses:

Clause 1: A coupler comprising a first connector including a first end having an inlet and a second end opposite the first end and having an opening, the first connector including at least one engaging member disposed between the first end and the second end, and a second connector including a body extending from an outlet portion, the body configured to be at least partially inserted into the opening to couple the second connector to the first connector, the outlet portion including at least one arm having a securing member configured to engage with the engaging member to secure the first connector to the second connector. When the second connector is coupled to the first connector, the outlet portion is exposed. The first connector is configured to decouple from the second connector in response to a pullout force exceeding a predetermined threshold force.

Clause 2: The coupler of clause 1 wherein the first connector includes a coupling portion disposed at the first end and a first connector body extending from the coupling portion, the first connector body including the opening.

Clause 3: The coupler of clause 2, wherein the first connector body includes the at least one engaging member.

Clause 4: The coupler of clause 1, wherein the securing member is a protrusion extending from a distal end of the at least one arm.

Clause 5: The coupler of clause 4, wherein the engaging member is a groove circumferentially disposed on the first connector, the groove sized and shaped to receive and secure the protrusion of the at least one arm when the second connector is coupled to first connector.

Clause 6: The coupler of clause 1, wherein the securing member is a recess disposed at a distal end of the at least one arm.

Clause 7: The coupler of clause 6, wherein the engaging member is an edge circumferentially disposed on the first connector, the recess of the at least one arm being sized and shaped to receive and secure the edge when the second connector is coupled to first connector.

Clause 8: The coupler of clause 1, wherein the pullout force is a force applied to the first connector along a central axis of the first connector and the central axis extends at least along a length of the first connector.

Clause 9: The coupler of clause 8, wherein the central axis extends through the first connector and the second connector when the first connector is coupled to the second connector.

Clause 10: The coupler of clause 1, wherein the at least one engaging member is groove circumferentially disposed on the first connector.

Clause 11: The coupler of clause 1, wherein the at least one engaging member is an edge circumferentially disposed on the first connector.

Clause 12: The coupler of clause 1, wherein the outlet portion includes an outlet and the body of the second connector includes a channel extending from the outlet to a second connector opening such that the outlet and the second connector opening are in fluid communication.

Clause 13: The coupler of clause 1, wherein the at least one arm includes a first portion extending away from the outlet portion and a second portion that extends radially inward.

Clause 14: The coupler of clause 1, wherein the at least one arm is biased radially inward and is configured to deflect radially outward.

Clause 15: The coupler of clause 1, wherein the securing member disengages from the engaging member in response to the pullout force exceeding the predetermined threshold force.

Clause 16: The coupler of clause 1, wherein the first connector is configured to remain coupled to the second connector when the pullout force does not exceed the predetermined threshold force.

Clause 17: The coupler of clause 1, wherein the coupler has a first configuration and in the first configuration the first connector is coupled to the second connector such that a fluid pathway is formed.

Clause 18: The coupler of clause 1, wherein the coupler has a second configuration and in the second configuration the first connector is decoupled from the second connector preventing formation of a fluid pathway.

Clause 19: A coupler comprising a first connector including a first end having a coupling portion with an inlet, a second end opposite the first end having an opening, and a first connector body extending from the coupling portion to the second end, the first connector including at least one engaging member disposed on the first connector body, and a second connector including an outlet portion having an outlet and a body extending from the outlet portion, the body being configured to be at least partially inserted into the opening to couple the second connector to the first connector, the outlet portion including at least one arm having a securing member configured to engage with the engaging member to secure the first connector to the second connector, the at least one arm being biased radially inward and configured to deflect radially outward. When the second connector is coupled to the first connector, the outlet portion is exposed and a fluid pathway forms from the inlet of the first connector to the outlet of the second connector. The first connector is configured to decouple from the second connector in response to a pullout force exceeding a predetermined threshold force.

Clause 20: A coupler comprising a substantially cylindrical first connector including a first end having a coupling portion with an inlet, a second end opposite the first end having an opening, and a first connector body extending from the coupling portion to the second end, the first connector including at least one engaging member circumferentially disposed on the first connector body between the first end and the second end, and a second connector including an outlet portion having an outlet and a body extending from the outlet portion, the body including a channel in fluid communication with the outlet and the body being configured to be at least partially inserted into the opening to couple the second connector to the first connector, the outlet portion including at least one arm having a securing member configured to engage with the engaging member to secure the first connector to the second connector, the at least one arm including a first portion extending away from the outlet portion and a second portion that extends radially inward, the at least one arm being biased radially inward and configured to deflect radially outward. When the second connector is coupled to the first connector, the outlet portion is exposed and a fluid pathway forms from the inlet of the first connector to the outlet of the second connector. The securing member disengages from the engaging member and the first connector is configured to decouple from the second connector in response to a pullout force exceeding a predetermined threshold force.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A locking connector coupling assembly comprising:
   a first connector including a first end having an inlet and a second end opposite the first end and having an opening, the first connector including at least one engaging member disposed between the first end and the second end; and
   a second connector including a body extending from an outlet portion, the body configured to be at least partially inserted into the opening to couple the second connector to the first connector, the outlet portion including at least one arm having a proximal end and a distal end having a securing member, the at least one arm having one or more inflection points between the proximal end and the distal end,
   wherein a first portion of the arm between the proximal end and an inflection point of the one or more inflection points extends radially away from the body and a second portion of the arm between the inflection point and the distal end extends radially inward,
   wherein the securing member is configured to engage with the engaging member to secure the first connector to the second connector such that, when the second connector is coupled to the first connector, the outlet portion is exposed,
   wherein the first connector is configured to decouple from the second connector in response to a pullout force exceeding a predetermined threshold force.

2. The locking connector coupling assembly of claim 1 wherein the first connector includes a coupling portion disposed at the first end and a first connector body extending from the coupling portion, the first connector body including the opening.

3. The locking connector coupling assembly of claim 2, wherein the first connector body includes the at least one engaging member.

4. The locking connector coupling assembly of claim 1, wherein the securing member is a protrusion extending from a distal end of the at least one arm.

5. The locking connector coupling assembly of claim 4, wherein the engaging member is a groove circumferentially disposed on the first connector, the groove sized and shaped to receive and secure the protrusion of the at least one arm when the second connector is coupled to first connector.

6. The locking connector coupling assembly of claim 1, wherein the securing member is a recess disposed at a distal end of the at least one arm.

7. The locking connector coupling assembly of claim 6, wherein the engaging member is an edge circumferentially disposed on the first connector, the recess of the at least one arm being sized and shaped to receive and secure the edge when the second connector is coupled to first connector.

8. The locking connector coupling assembly of claim 1, wherein the pullout force is a force applied to the first connector along a central axis of the first connector and the central axis extends at least along a length of the first connector.

9. The locking connector coupling assembly of claim 8, wherein the central axis extends through the first connector and the second connector when the first connector is coupled to the second connector.

10. The locking connector coupling assembly of claim 1, wherein the at least one engaging member is a groove circumferentially disposed on the first connector.

11. The locking connector coupling assembly of claim 1, wherein the at least one engaging member is an edge circumferentially disposed on the first connector.

12. The locking connector coupling assembly of claim 1, wherein the outlet portion includes an outlet and the body of the second connector includes a channel extending from the outlet to a second connector opening such that the outlet and the second connector opening are in fluid communication.

13. The locking connector coupling assembly of claim 1, wherein the at least one arm is biased radially inward and is configured to deflect radially outward.

14. The locking connector coupling assembly of claim 1, wherein the securing member disengages from the engaging member in response to the pullout force exceeding the predetermined threshold force.

15. The locking connector coupling assembly of claim 1, wherein the first connector is configured to remain coupled to the second connector when the pullout force does not exceed the predetermined threshold force.

16. The locking connector coupling assembly of claim 1, wherein the coupler has a first configuration and in the first configuration the first connector is coupled to the second connector such that a fluid pathway is formed.

17. The locking connector coupling assembly of claim 1, wherein the coupler has a second configuration and in the second configuration the first connector is decoupled from the second connector preventing formation of a fluid pathway.

18. A locking connector coupling assembly comprising:
a first connector including a first end having a coupling portion with an inlet, a second end opposite the first end having an opening, and a first connector body extending from the coupling portion to the second end, the first connector including at least one engaging member disposed on the first connector body; and
a second connector including an outlet portion having an outlet and a body extending from the outlet portion, the body being configured to be at least partially inserted into the opening to couple the second connector to the first connector, the outlet portion including at least one arm having a securing member configured to engage with the engaging member to secure the first connector to the second connector, the at least one arm having a proximal end, a distal end, and one or more inflection points between the proximal end and the distal end, and being configured to deflect radially outward,
wherein a first portion of the arm between the proximal end and an inflection point of the one or more inflection points extends radially away from the body and a second portion of the arm between the inflection point and the distal end extends radially inward,
wherein when the second connector is coupled to the first connector, the outlet portion is exposed and a fluid pathway forms from the inlet of the first connector to the outlet of the second connector,
wherein the first connector is configured to decouple from the second connector in response to a pullout force exceeding a predetermined threshold force.

19. A locking connector coupling assembly comprising:
a substantially cylindrical first connector including a first end having a coupling portion with an inlet, a second end opposite the first end having an opening, and a first connector body extending from the coupling portion to the second end, the first connector including at least one engaging member circumferentially disposed on the first connector body between the first end and the second end; and
a second connector including an outlet portion having an outlet and a body extending from the outlet portion, the body including a channel in fluid communication with the outlet and the body being configured to be at least partially inserted into the opening to couple the second connector to the first connector, the outlet portion including at least one arm having a securing member configured to engage with the engaging member to secure the first connector to the second connector, the at least one arm including a first portion that extends away from the outlet portion at a first angle and a second portion that extends away from the outlet portion at a second angle different from the first angle, the at least one arm being biased radially inward and configured to deflect radially outward,
wherein when the second connector is coupled to the first connector, the outlet portion is exposed and a fluid pathway forms from the inlet of the first connector to the outlet of the second connector,
wherein the securing member disengages from the engaging member and the first connector is configured to decouple from the second connector in response to a pullout force exceeding a predetermined threshold force.

* * * * *